(12) United States Patent
McGuire (10) Patent No.: US 7,051,897 B2
(45) Date of Patent: May 30, 2006

(54) CLOSURE FOR A PRESSURE VESSEL AND METHOD

(75) Inventor: Douglas J. McGuire, Houston, TX (US)

(73) Assignee: Robbins & Myers Energy Systems, L.P., Willis, TX (US)

( * ) Notice: Subject to any disclaimer, the term of this patent is extended or adjusted under 35 U.S.C. 154(b) by 213 days.

(21) Appl. No.: 10/188,558

(22) Filed: Jul. 2, 2002

(65) Prior Publication Data

US 2004/0004081 A1 Jan. 8, 2004

Related U.S. Application Data

(63) Continuation-in-part of application No. 29/150,087, filed on Nov. 5, 2001, now abandoned.

(51) Int. Cl.
*F16J 13/10* (2006.01)
*B65D 45/34* (2006.01)

(52) U.S. Cl. ............... 220/321; 220/319; 220/234; 220/263; 220/835; 49/395; 49/465; 292/256.65; 292/256.69; 411/519

(58) Field of Classification Search ............... 277/632, 277/651; 220/234, 240, 242, 262, 263, 264, 220/316, 319, 320, 321, 323, 833, 835; 49/395, 49/394, 465; 292/48, 256.6, 256.65, 256.69; 285/123.13, 123.9, 305, 321, 920; 411/517, 411/518, 519
See application file for complete search history.

(56) References Cited

U.S. PATENT DOCUMENTS

| | | | | |
|---|---|---|---|---|
| 1,673,011 A | * | 6/1928 | Mauser | 292/256.6 |
| 2,203,364 A | * | 6/1940 | Rathbun | 220/240 |
| 2,352,192 A | * | 6/1944 | Gasche | 292/256.69 |
| 2,721,094 A | * | 10/1955 | Webster | 292/256.69 |
| 3,575,428 A | * | 4/1971 | Fuhrmann et al. | 277/601 |
| 3,642,166 A | * | 2/1972 | Starr | 220/320 |
| 3,667,649 A | * | 6/1972 | Thillet | 220/323 |
| 3,748,785 A | * | 7/1973 | Craig | 49/394 |
| 4,140,240 A | * | 2/1979 | Platts | 220/323 |
| 4,303,177 A | * | 12/1981 | Amtmann | 220/323 |
| 4,315,577 A | | 2/1982 | Bernson | |
| 4,387,740 A | | 6/1983 | Vanzant | |
| 4,693,278 A | | 9/1987 | Wilson et al. | |
| 4,815,627 A | | 3/1989 | Marshall | |
| 4,883,637 A | | 11/1989 | McDaniels | |
| 4,954,004 A | * | 9/1990 | Faber et al. | 403/13 |
| 5,127,535 A | | 7/1992 | Shinno | |
| 5,346,090 A | * | 9/1994 | Purohit et al. | 220/23.87 |
| 5,421,474 A | * | 6/1995 | Ramillon et al. | 220/319 |
| 5,700,043 A | * | 12/1997 | Rohard et al. | 292/256.6 |
| 5,853,207 A | * | 12/1998 | Saint Martin et al. | 292/256.6 |
| 6,308,995 B1 | | 10/2001 | Simson | |
| 6,401,958 B1 | * | 6/2002 | Foss et al. | 292/256.6 |
| 6,439,415 B1 | * | 8/2002 | Salim et al. | 220/323 |

FOREIGN PATENT DOCUMENTS

EP     0 129 349     5/1984

(Continued)

*Primary Examiner*—Nathan J. Newhouse
*Assistant Examiner*—James Smalley
(74) *Attorney, Agent, or Firm*—Browning Bushman P.C.

(57) ABSTRACT

A closure assembly 10 contains positive and/or vacuum pressure within a pressure vessel 16 having a neck 12. A circumferential locking member 22 supported on a door 20 locks the door to the neck, and is radially moveable between an open position and a closed position. A seal 26 between the neck and the door maintains fluid-tight integrity. A lever or other hand powered operator may be used for moving the locking member between the open position and the closed position. The locking member may include locking segments interconnected to form the circumferential locking member.

14 Claims, 13 Drawing Sheets

FOREIGN PATENT DOCUMENTS

| | | |
|---|---|---|
| EP | 1 054 195 A1 | 7/2000 |
| GB | 2 134 206 A | 1/1983 |
| GB | 2134206 * | 8/1984 |
| GB | 2 172 956 A | 2/1985 |
| GB | 2172956 A * | 10/1986 |
| GB | 1 594 936 | 11/1998 |

* cited by examiner

CLOSURE FOR A PRESSURE VESSEL AND METHOD

RELATED APPLICATION

The application is a Continuation-In-Part of U.S. Design Application 29/150,087, filed 05 Nov. 2001 now abandoned.

FIELD OF THE INVENTION

The present invention relates to closures of the type used for sealing the end of a pressure vessel, such as a pipe. More particularly, the present invention relates to an improved closure for reliably sealing either positive pressure or a partial vacuum within the vessel, while allowing easy access to the pressure vessel by opening the door.

BACKGROUND OF THE INVENTION

Various designs of quick acting closures (clamp type, clutch type, screw type and bridge type) have been utilized on pressure vessels, including pipelines, within the chemical, oil and gas, food, and nuclear industries. The demand to frequently obtain access to pressure vessels has been increasing, thereby enhancing the need for a safe closure that provides quick opening and closing/sealing capabilities.

Examples of prior art closures are disclosed in U.S. Pat. Nos. 5,127,535; 4,387,740; 4,693,278; 4,815,627; 4,883,637; 4,315,577. Many of these prior art designs are similar in concept, but are complex, difficult to manufacture and operate, and/or require removal of material from critical pressure retaining surfaces that prevent compliance with international design codes. In-addition, these prior art designs do not and some practically cannot incorporate an integral safety locking feature that prevents unsafe handling and operation of the closure. European Patent Specification 0129349 discloses a closure which does include a safety locking feature, although the closure does not overcome many of the other deficiencies with prior art closures.

The disadvantages of the prior art are overcome by the present invention, and an improved closure and method of closing a door on a pressure vessel are hereinafter disclosed.

SUMMARY OF THE INVENTION

The present invention relates to a quick opening closure which uses a load bearing locking member and a seal for either vacuum or positive pressure containment between the door and the pressure vessel neck. The hollow neck preferably has one end profiled for fixed attachment to pipe or other pressure vessel, such as a tank, and an internal profile to accept the locking member. The door is thus preferably positioned within the neck and the locking member is expanded to retain the door within the neck. The closing procedure creates sufficient force to energize a seal and create a pressure retaining boundary between the closed door and the neck. To open the door, the locking member is radially retracted from within the neck using a hand or powered operator, permitting the movement of the door, e.g., pivoting the hinged door open.

It is an object of the present invention to provide a closure for sealing with a pressure vessel, including a neck for attaching to the vessel, with a neck having an access port and an interior profile for radially receiving a locking member when the door is in the closed position. The locking member is carried by the door and is radially moveable between an open position and a closed position by an operator. The seal between the neck and the door maintains the pressure differential between the vessel pressure and the atmosphere when the locking member is in the closed position.

A related object of the invention is to provide an improved method of opening and closing a closure for sealing with a pressure vessel and for obtaining access to a pressure vessel through a neck having an access port and an interior profile for radially receiving the locking member when the door is in the closed position. The locking member is carried by the door and is radially moveable between an open position and a closed position in response to an operator, which may be a hand operator or a fluid powered operator. On closing the door, a seal is energized between the neck and the door to maintain the pressure differential.

It is a feature of the invention that the neck secured to the pressure vessel includes an interior profile for radially receiving both the locking member and the door when the door is in the closed position.

Another feature of the invention is that the closure may be operated by various means, including hand operator or a fluid powered operator for moving the locking member between the open and closed position.

Another feature of the invention is that the locking member comprises a plurality of locking segments circumferentially spaced around the door, with an end of one locking segment being interconnected with an end of another segment. A plurality of locking segments may be interconnected by a flexible band, by a plurality of band segments, or by knuckle joints. The flexible band may be positioned with a T-slot formed in the radially inner portion of each locking segment.

Another feature of the present invention is a door operator which includes a pair of control fingers each linearly moveable with respect to the door and pivotally connected to a respective end of the locking member. The operator may include a lever moveable from a closed position to an open position, and a linkage mechanism interconnecting the lever with each of the pair of control fingers. An adjustment member preferably is provided for adjusting the linkage mechanism to alter the position of a locking member with respect to the lever.

Yet another feature of the invention is the use of a pressure energized seal with a back-up ring for use between the door and the neck. In an alternative design, the pressure energized seal is supported by a coil spring.

A further feature of the invention is that the door may be either a substantially flat door or a domed door. In many applications, the door will be pivotally connected by a hinge to the neck, so that the door is swung open.

It is a feature of the present invention that a pressure warning device may be used for signaling a pressure condition within the enclosure.

An advantage of the present invention is that the closure is highly reliable, and the door may be easily opened and closed.

These and further objects, features, and advantages of the present invention will become apparent from the following detailed description, wherein reference is made to the figures in the accompanying drawings.

BRIEF DESCRIPTION OF THE DRAWINGS

FIG. 8A depicts in cross-section a flat sided lock ring, while

FIG. 10 illustrates a front view of a hand operated over center cam arrangement to expand and contract the locking member, while

FIG. 12 depicts yet another over center cam embodiment, while

DETAILED DESCRIPTION OF PREFERRED EMBODIMENTS

Figure 1:
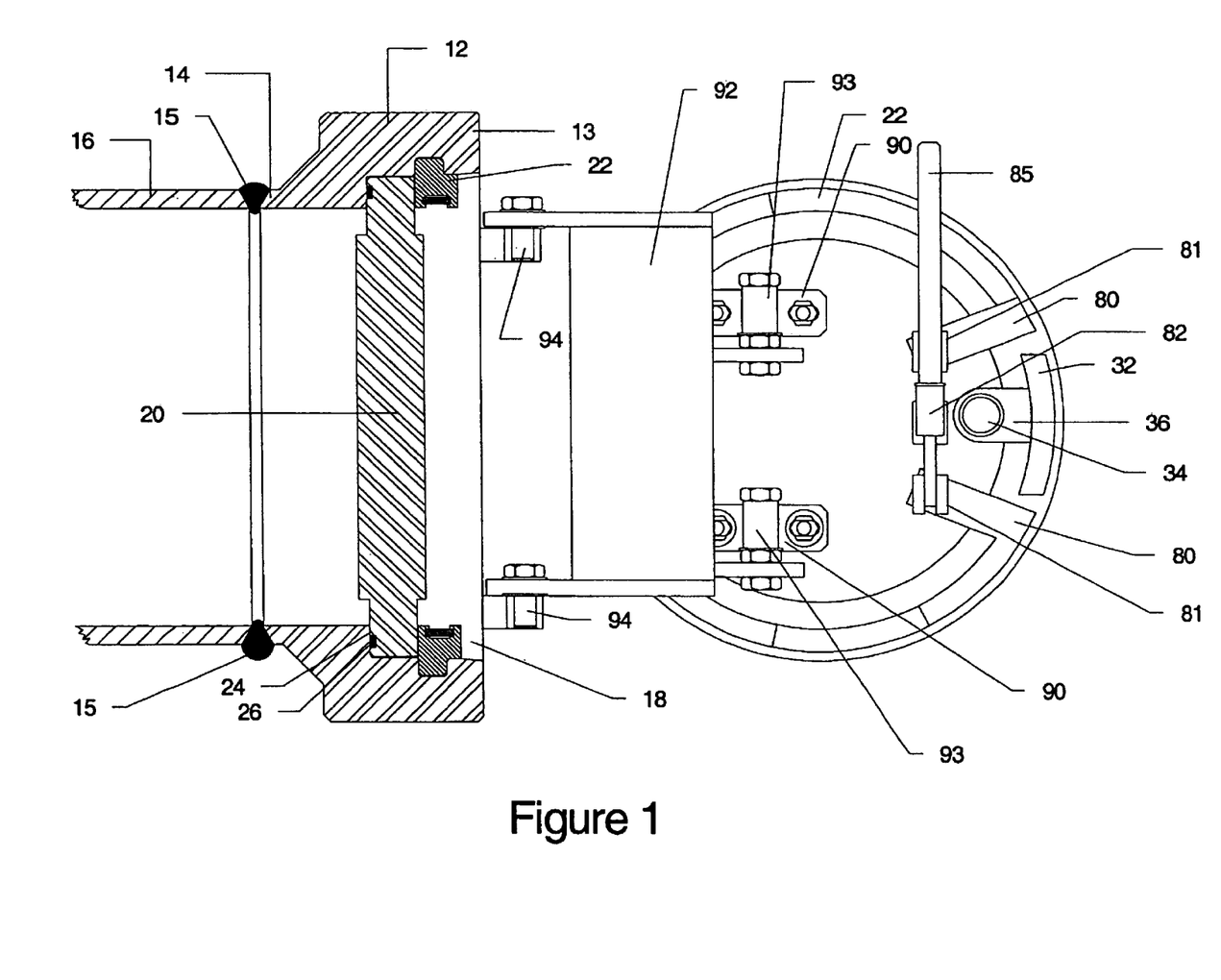
FIG. 1 is a partial sectional view of a closure and periphery hardware for door operation in the horizontal position.
Figure 3:
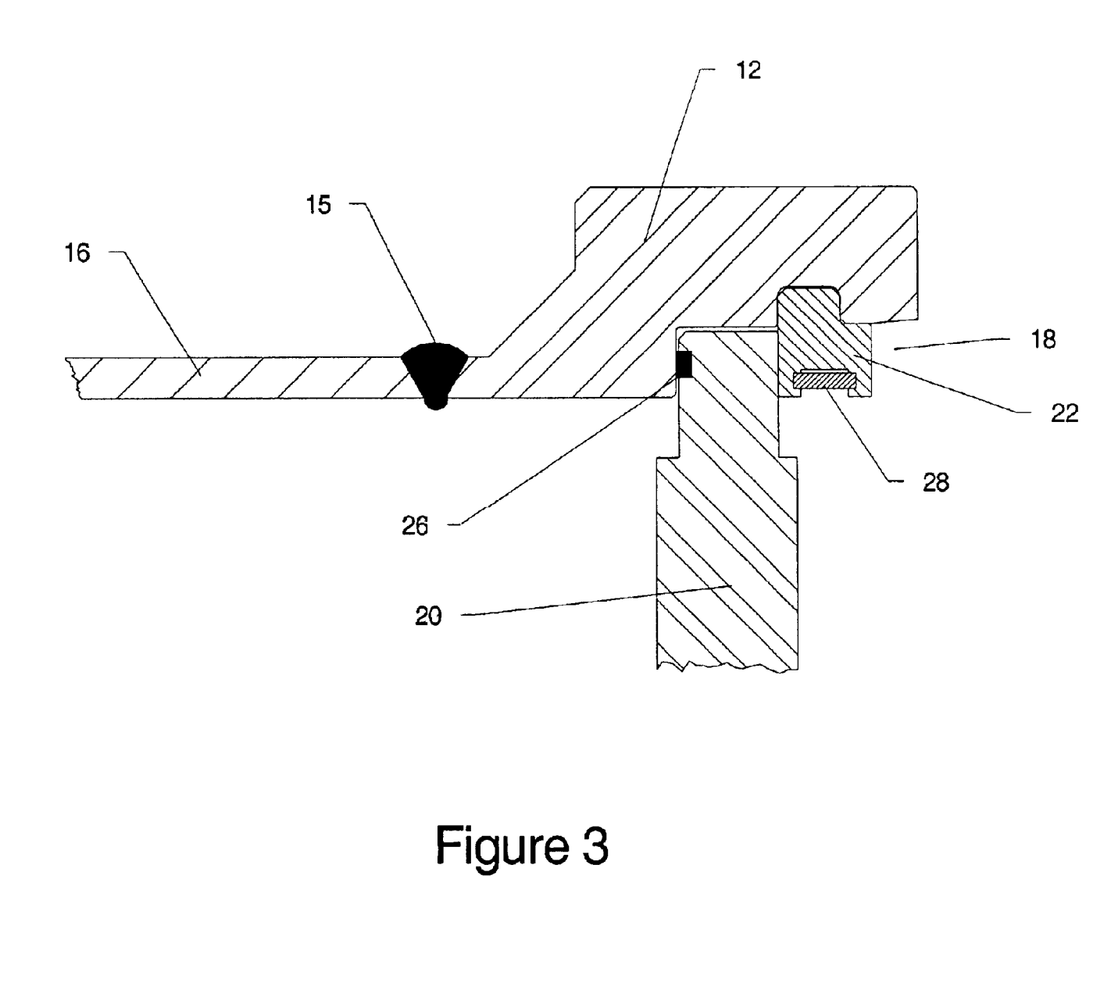
FIG. 3 is a partial sectional view of the locking member in the closed position.

A closure assembly 10 is provided for retaining positive and/or vacuum pressures within a pressure vessel 16, typically by a weld 15. A neck 12 having a beveled free end 13 and an attachment end 14 is secured to a pipeline, tank, or other pressure vessel 16, typically by a weld 15. In a preferred embodiment, the neck 12 includes an internal profile 18 for receiving an actuated locking member 22 and a door 20, as shown in FIG. 3. An internal profiled ledge 24 within the closure neck 12 provides a sealing surface against which an elastomeric seal 26 is pressed to form a pressure retaining boundary. A reliable seal across the pressure differential between vessel pressure and atmosphere may be achieved by a hand applied force, or with a fluid powered actuator, as explained below. FIG. 1 shows the position at the locking member 22 in dashed lines when the door 20 is closed and the locking member 22 is in the closed position.

Figure 4:
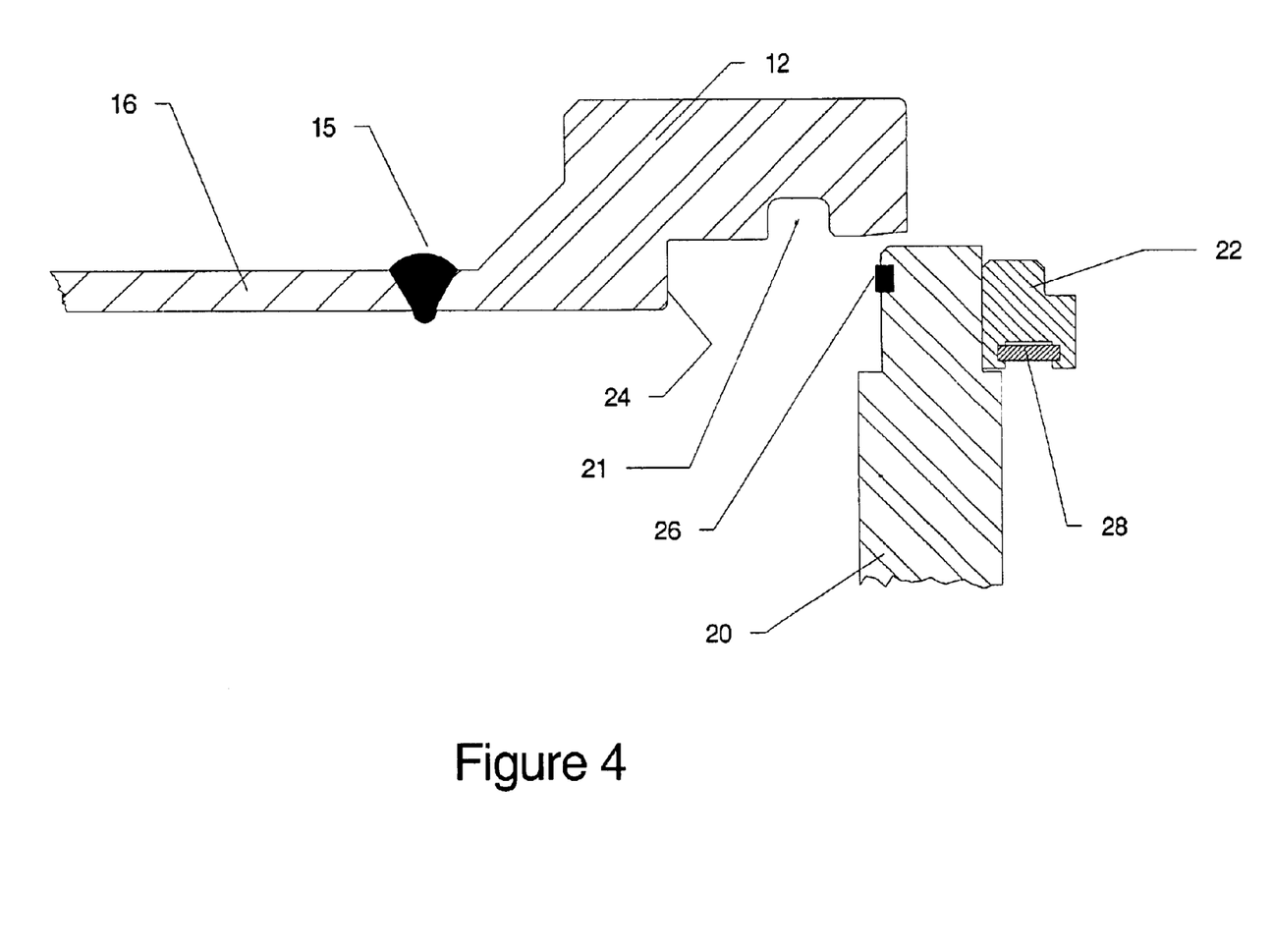
FIG. 4 is a partial sectional view of the locking member in the open position.

Locking member 22 is radially expandable and contractible to retain the door 20 closed when expanded (as depicted in FIGS. 1 and 3), and to permit the door 20 to be removed from the neck 12 (opened) when contracted (as depicted in FIG. 4). The locking member extends about all or substantially all of the circumference of the door, so that if the door has a circular configuration, which is customary in the industry, a locking member is curved or arcuate, and in a preferred embodiment comprises a plurality of curved or arcuate locking segments to form the locking member.

Various types of operators may be used to facilitate the contracting or expanding of the locking member, including hand operators and hydraulic or pneumatic powered operators.

FIG. 1 depicts the neck 12 in cross section and the door in solid lines swung into the open position for obtaining access to the pressure vessel. Mounting brackets 90 are bolted and otherwise secured to the body of the door, with hinge plate 92 connected to the brackets 90 by pivot member 93. The plate 92 in turn may be pivotally connected to a pair of mounts 94, which are welded or otherwise secured to the neck 12. The door is thus moved from the closed to the open position in a substantially horizontal plane. The remaining components of a door 20 as shown in FIG. 1 are discussed further below. FIG. 4 shows a cross section of the circular slot 21 in the neck 16 sized to receive the locking ring 22.

Figure 2:
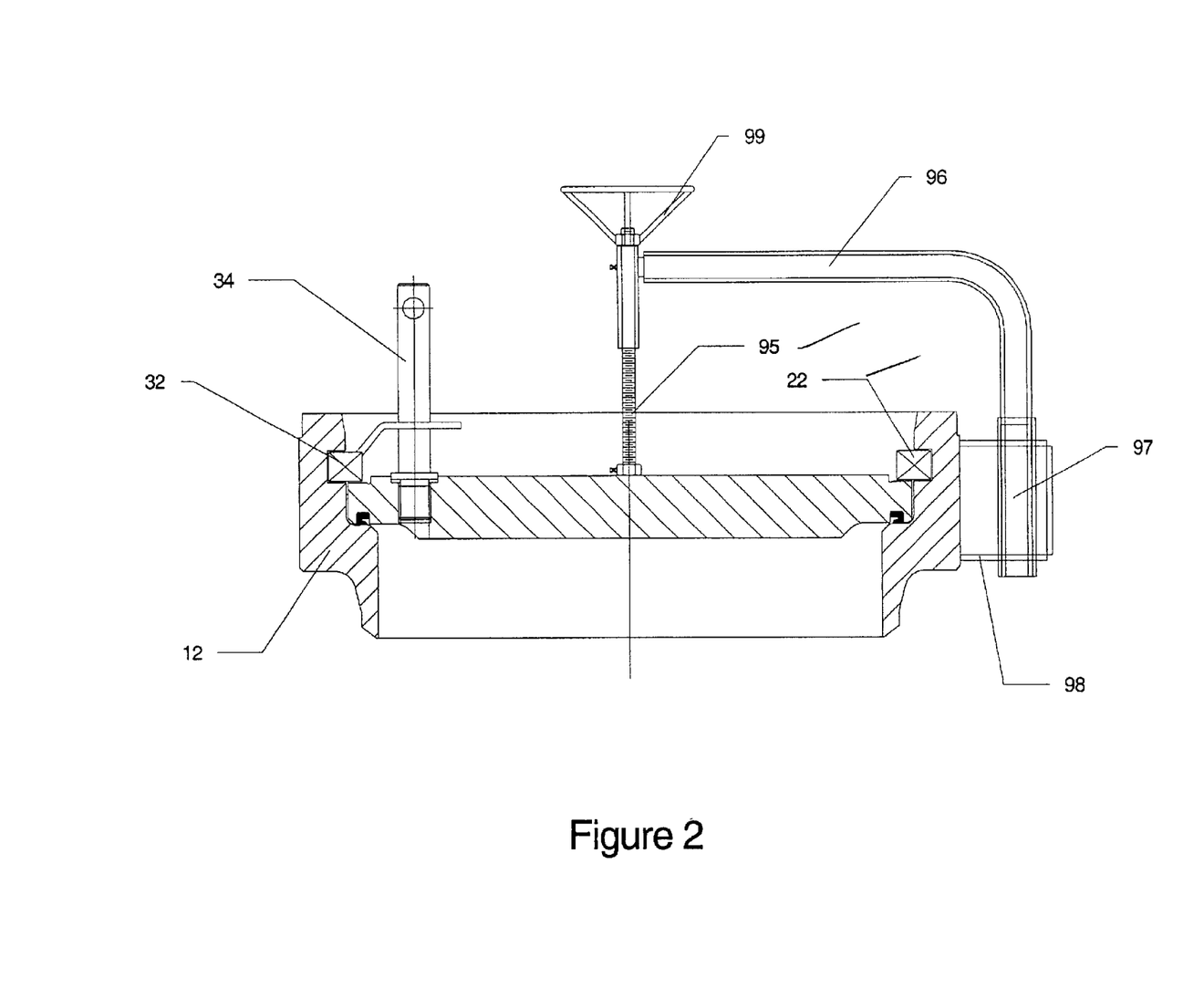
FIG. 2 is a partial sectional view of a closure for door operation in the vertical position.

FIG. 2 depicts a door 20 closed in the neck 12 with the door being moveable vertically from an open to a closed position. Swing arm 96 may be interconnected with mount 98, which is secured to the neck 12. Bearing package 97 allows the door to swing away from the neck when the door is open. Threaded rod 95 is connected at one end to the door 20, such that the vertical movement of the threaded rod and thus the door being controlled by rotation of hand crank 99. The present invention may thus be used regardless of how the door is supported for movement in the open and the closed positions. Alternative mounting arrangements for vertical opening of the door include counterweight mechanisms and spring assisted hinges, each well known in the art.

The locking member 22 retains high fluid pressure or vacuum within the vessel by a combination of shear and compression forces. The dimensions for the locking member should be calculated using safe and prudent safety factors to insure compliance with international design codes. An alternative locking member may be machined with a tapered or frustoconical contact surface for engagement with a mating surface formed by the interior profile of the neck, thereby permitting the force created by internal pressure to be retained by the locking member in compression rather than shear, or in a combination of compression and shear forces. Alternative cross sections for the locking member are shown in FIGS. 8A and 8B.

Various arrangements for locking member 22 are envisioned, depending on the size and pressure retaining requirements of a particular installation. A simple single piece locking member may include a slot (removed portion) which may be substantially filled by a slot segment to prevent contraction of the locking ring and opening of the door. The slot segment may be used with integral safety warning device, as discussed below. Retraction of the slot segment from the slot allows radial contraction of the locking member.

Figure 5:
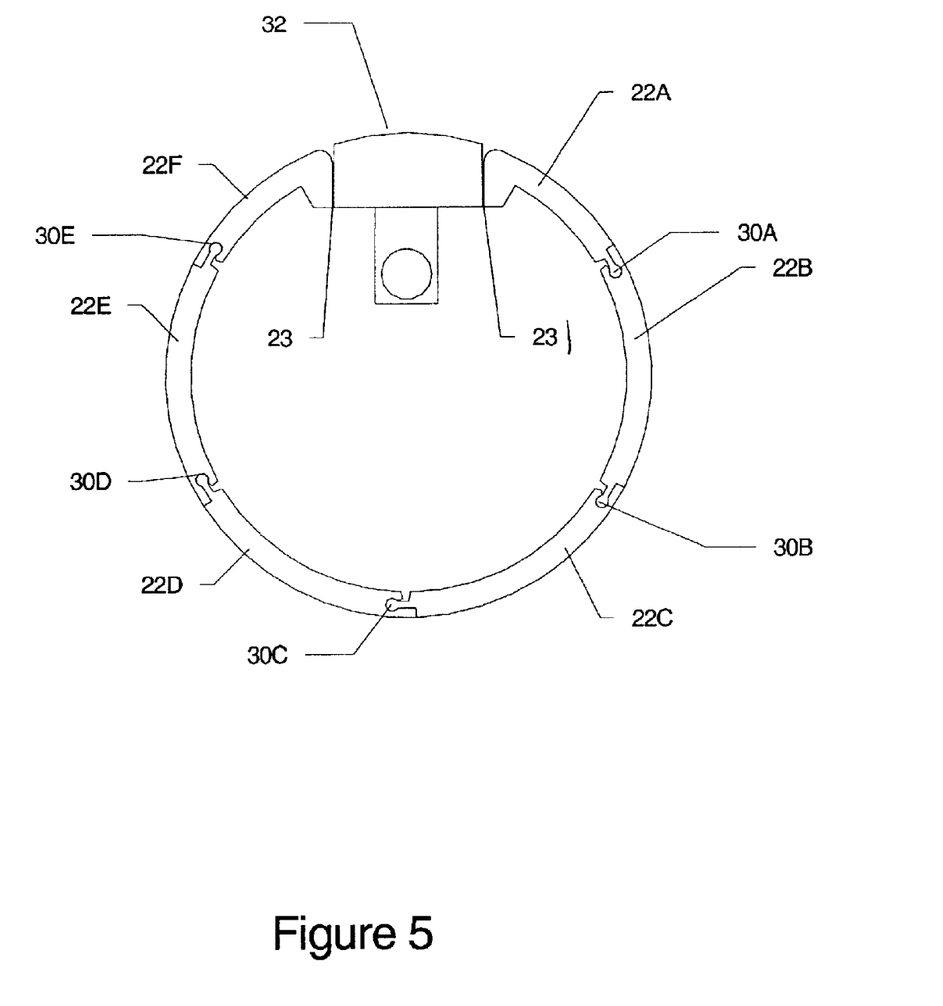
FIG. 5 illustrates a locking member having circumferentially spaced locking segments each incorporating knuckle joints to permit expansion or contraction of the locking member.

For large closure applications, the cross-section of the locking member 22 may practically prevent contraction and expansion of a single piece locking member by hand. In other applications, a locking member having structurally connected segments will be preferred. As depicted in FIG. 5, the locking member 22 is segmented into smaller portions 22A, 22B, 22C, 22D, etc. In FIG. 5, the locking member segments are interconnected by circumferentially projecting members or hinges 30A, 30B, etc., which each fit into a corresponding slot in the adjacent member, with the head of the projection having a width greater than the neck of the slot, thereby allowing pivoting action between, e.g., 22A and 22B, while also interlinking the segments and allowing the interconnected members to move in contraction and expansion substantially as a single member. While six locking segments are shown in FIG. 5, the desired number will depend on the door size and the application.

Figure 6:
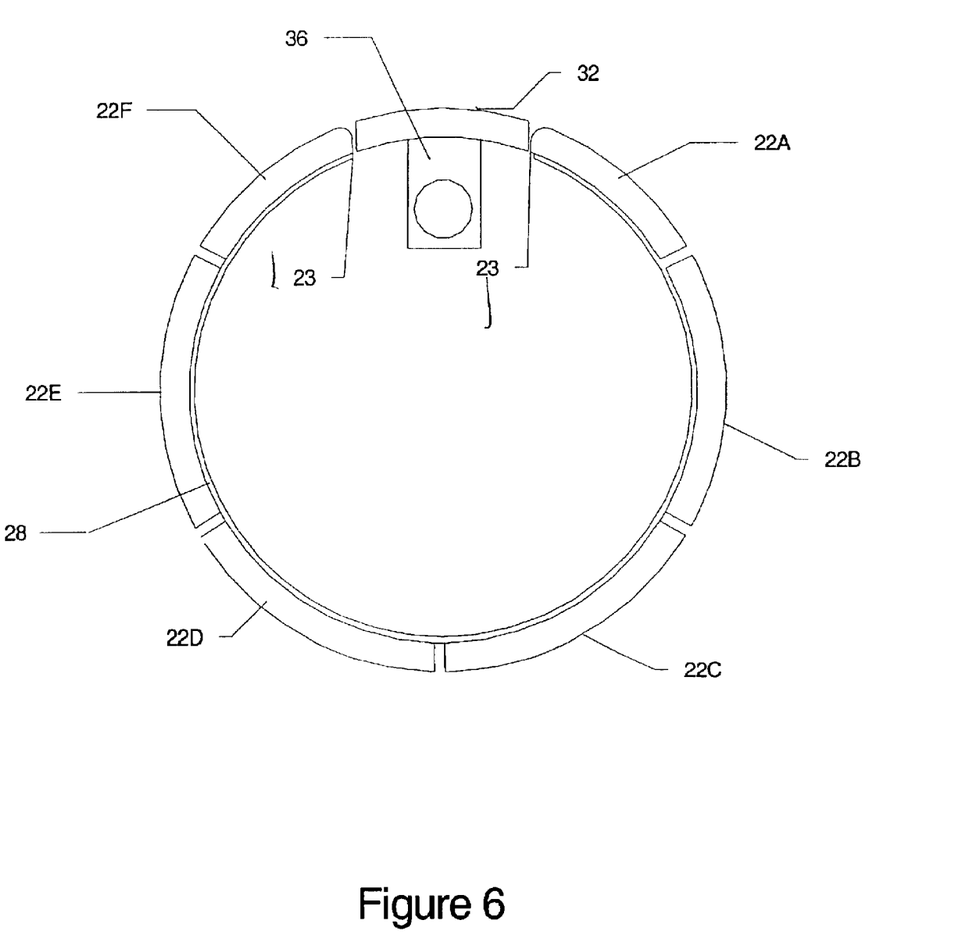
FIG. 6 depicts an inner carrier band style locking member.
Figure 7:
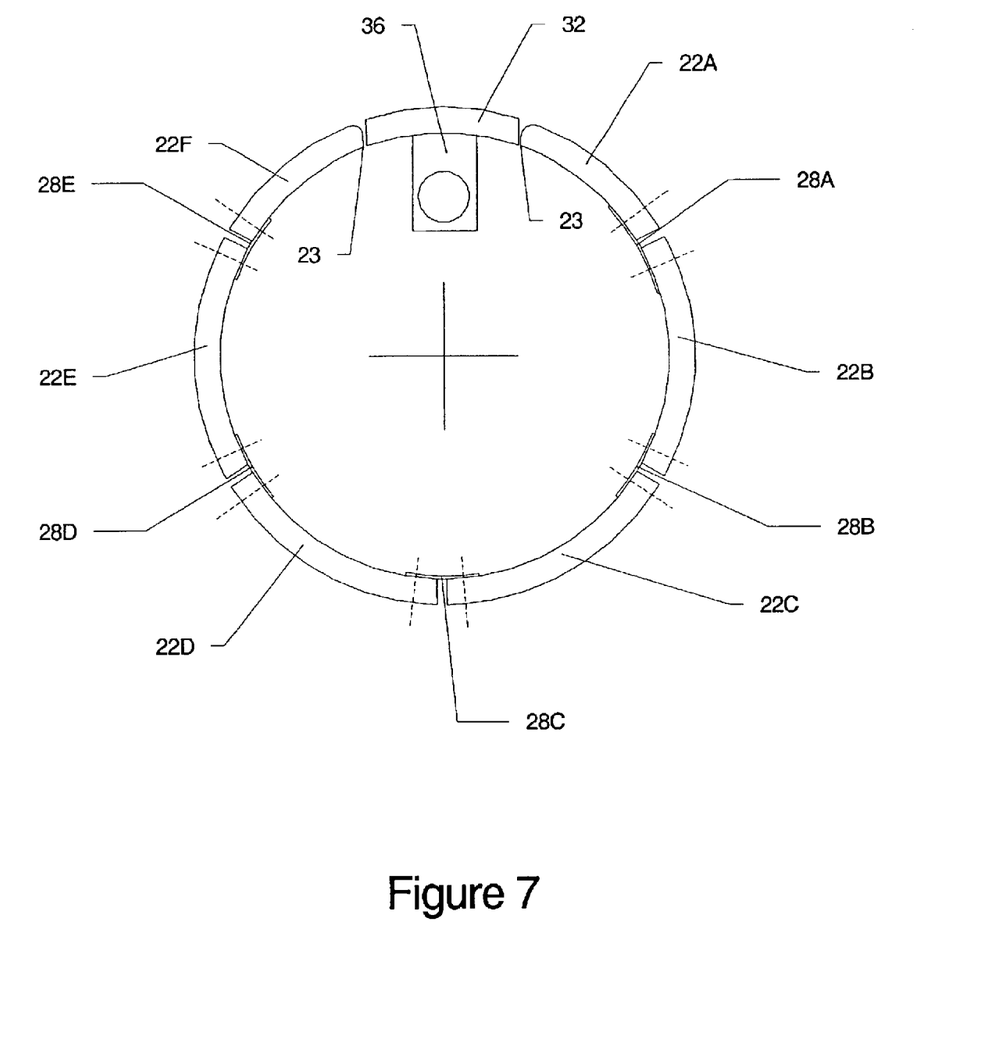
FIG. 7 depicts band segments for interconnecting the locking segments.

FIG. 6 depicts the circumferentially spaced locking segments each attached to a thin carrier band 28, e.g., a bolt assembly or by welding. The inner carrier band 28 forms a continuous ring with the circumferentially spaced segments 22A, 22B, 22C, etc. Partial inner band segments 28A, 28B, 28C, etc. as shown in FIG. 7 straddle the locking segment joints, and may be attached by bolting or welding to the locking segments. The cross sectional thickness of carrier band 28 (or band segments as shown in FIG. 7) is thus substantially less than the locking segments 22A, 22B, etc. to permit easy contraction and expansion of the locking member, while providing the locking force of the locking segments. A continuous locking member comprising circumferentially spaced locking segments permits easy contraction and expansion by hand.

Figure 8:
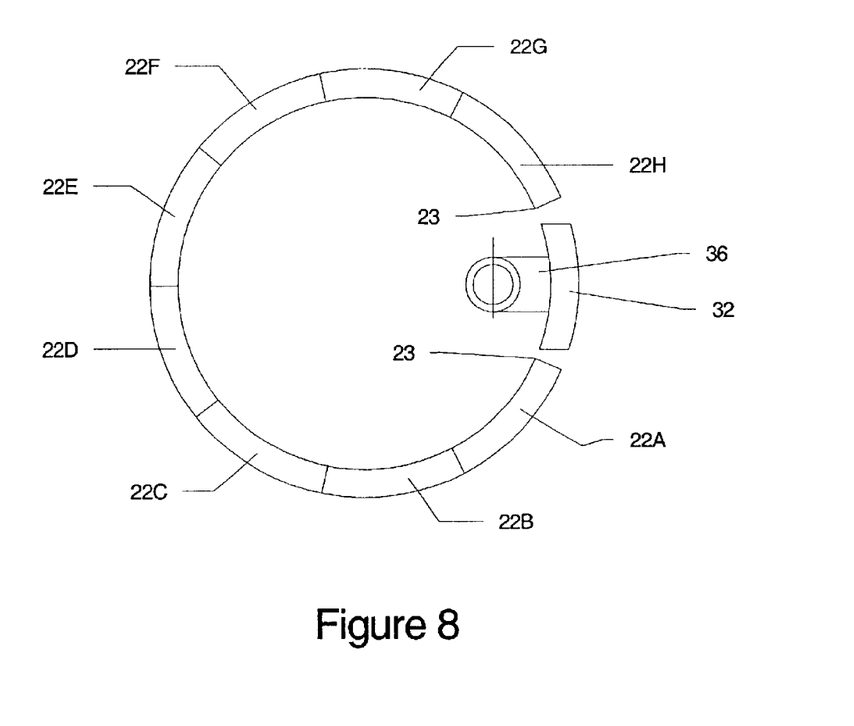
FIG. 8 depicts another technique for interconnecting the locking segments.
Figure 8A:
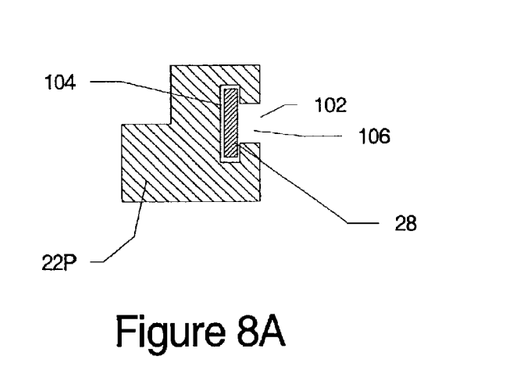
Figure 8B:
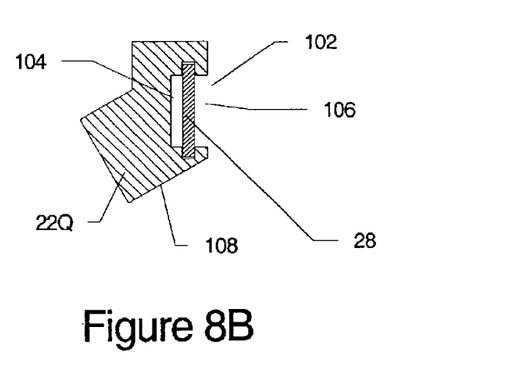
FIG. 8B depicts a tapered lock ring.

FIG. 8 depicts a locking segment of a locking member which may be similar to the locking segments shown in FIG. 6, except for the cross-sectional configuration of the locking segments. Segment 22P as shown in FIG. 8A depicts the cross section for all the segments shown in FIG. 8, and includes a T-shaped slot 102 having a wide band receiving portion 104 and a narrow neck portion 106. Continuous band 28 similar to the band shown in FIG. 6 may be fitted into the T-slot by angling the band and passing the band into the slot as one moves along the circumference of the band. The neck portion 104 retains the band in the slot and interconnects the plurality of locking segments. The ends of the band 28 may be bolted or otherwise secured to the locking segments adjacent the slot 23. FIG. 8B depicts an alternative embodiment with an angled or tapered lock ring segment 22Q. The circular slot in the neck 12 is enlarged to receive the tapered locking segments, and tapered surface 108, when against a mating planar surface of the neck slot, creates a radially outward force on the ring segments in response to high pressure acting on the door, thereby creating a high force to resist moving the tapered locking segments to the open position when pressure in the vessel is high.

One or more locking member designs may be used according to the present invention, with significant advantages to using a plurality of circumferentially spaced and interconnected locking members for large closures. Each locking member includes an arc-shaped surface for engagement with a mating surface on the neck to maintain a door with a generally circular configuration closed. By providing a locking member on the door, the size and weight of the neck may be reduced compared to designs which include a locking member mounted on the neck.

Figure 9:
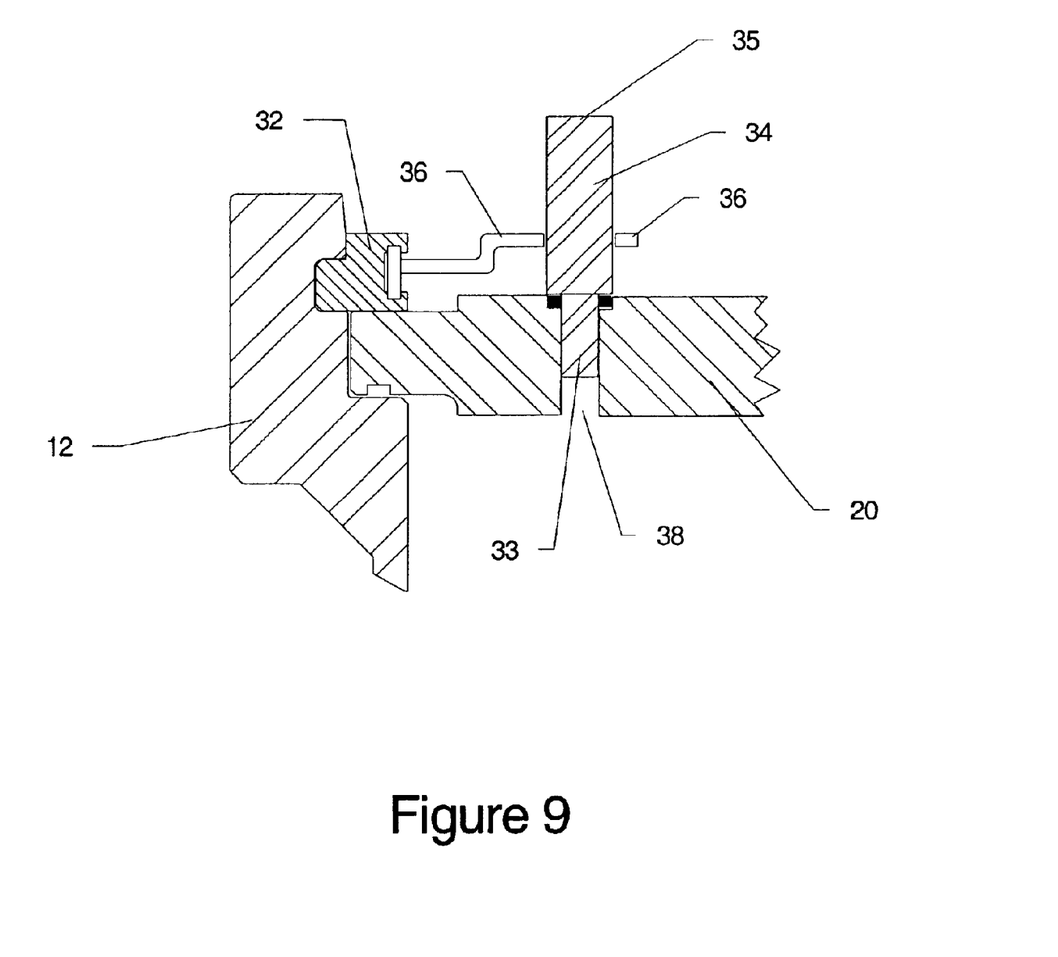
FIG. 9 illustrates a safety warning device for compliance with design codes.

The circumferential slot 23 in the otherwise circular locking member 22 permits contraction of the locking member to the open position. A slot segment 32 positioned within the slot in locking member 22 may be attached to the safety device 34 by plate 36, as shown in FIG. 9, although various attachment devices may be used. Safety device 34 may be a relatively single metal block with a threaded end 33 and an opposing end 35 which includes hexagonal flats or other torque transmitting surfaces for threading and unthreading the safety device to the door. When the safety device is attached to the door or shown in FIG. 9, the slot segment 32 cannot be moved radially inward to the door open position. If there is a pressure differential across the door, the gauge (not shown) will display that pressure to the operator. If the safety device 34 is unthreaded, the escaping (or entering) gas will be detected by the operator. As long as pressure in the vessel is substantially greater than atmosphere, pressure force on the door presses on segment 32 and partially prevents any movement of segment 32 out of the slot 23 of the locking member. For compliance with numerous international pressure vessel design codes, the closure includes a safety warning device that forms an integral component of the operating cycle. A drilled hole 38 in the door 20 may be threaded to mount safety device 34 to the door, thereby plugging the hole within door 20 and completing the pressure boundary.

The plate 36 positions the slot segment 32 within the slot 23 in the locking member 22 when expanded to the closed position. Operation of the safety device is similar to the operation of the locking member 22. After expansion of the locking member 22 to the closed position, the slot segment 32 is introduced into the space or slot 23 necessary to permit contraction of the locking member. The segment 32 thus substantially fills the slot 23 and completes a substantially full 360 degree pressure bearing surface.

Figure 10:
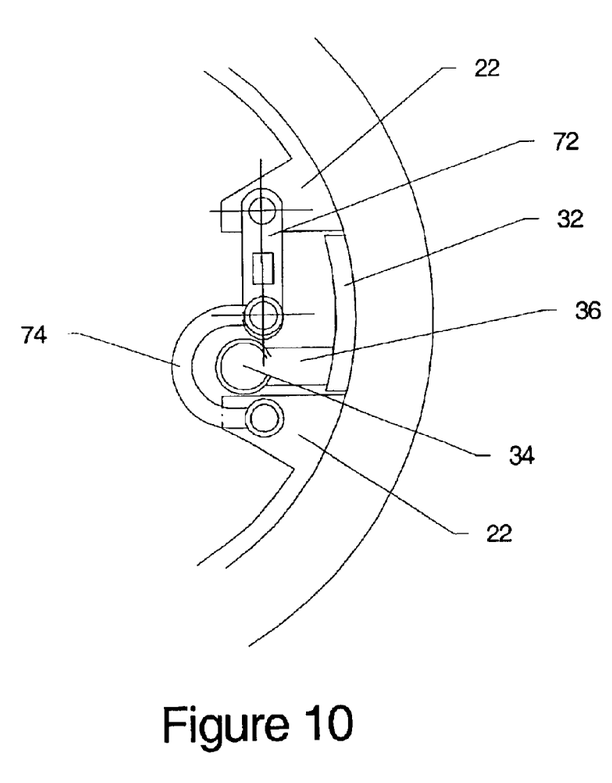
Figure 10A:
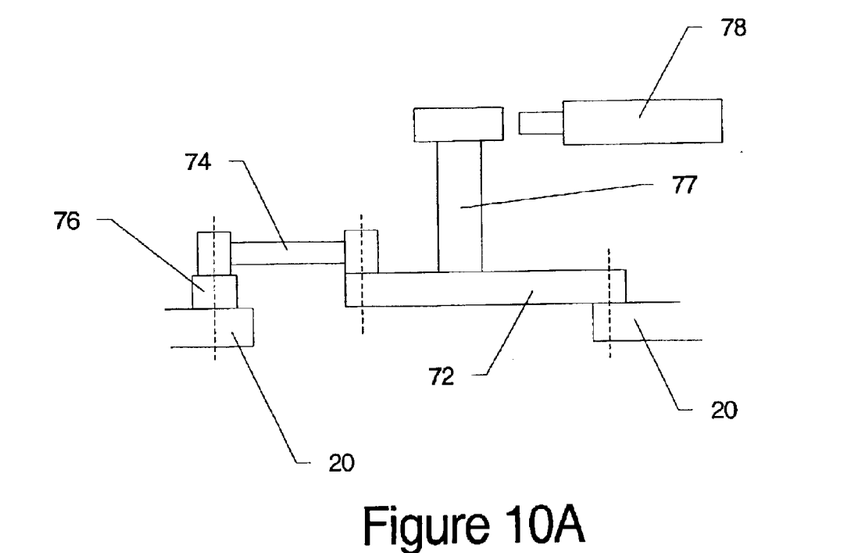
FIG. 10A depicts a side view of the components shown in FIG. 10.
Figure 11:
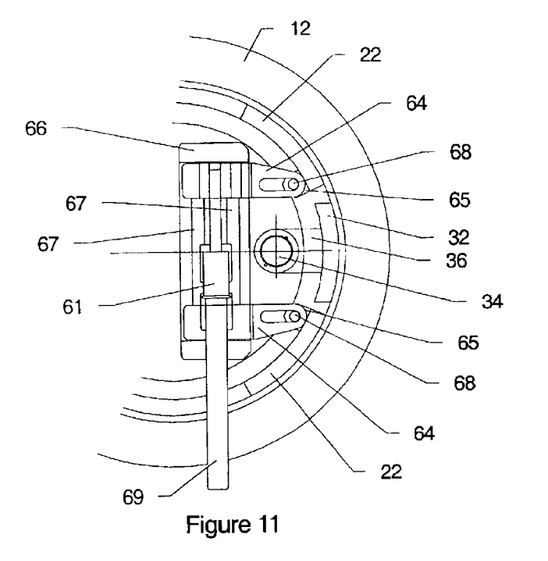
FIG. 11 depicts a front view of an alternate embodiment of an over center cam arrangement.
Figure 12:
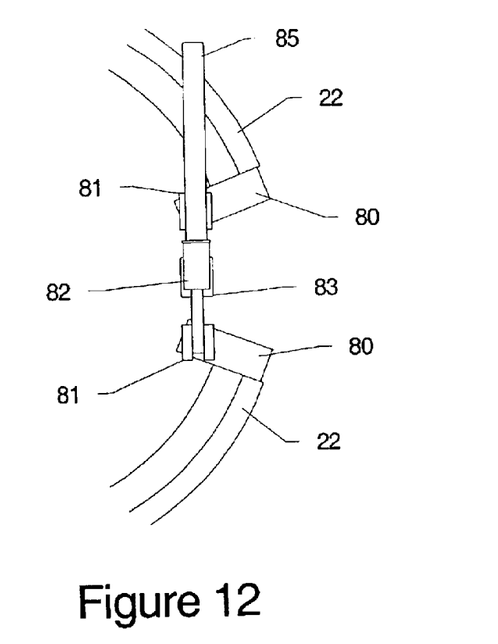
Figure 12A:
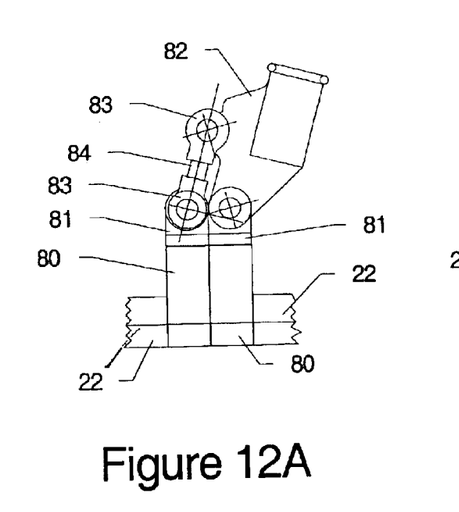
FIGS. 12A and 12B depict the open and closed positions, respectively, of this embodiment.
Figure 12B:
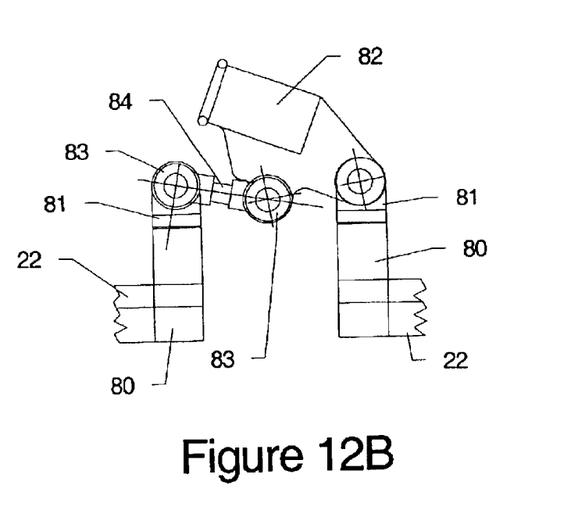

Numerous types of manually operator or power operated devices may be used to control the expansion and contraction of the locking member, including pneumatic, hydraulic and electrically powered devices. For many applications, a simple hand lever device 70 including an over center cam arrangement as illustrated in FIGS. 10, 11 and 12 may be used. Pivotally attached to one end of locking member 22 is lever 72, as shown in FIG. 10, which is pivotally attached at the other end to the floating lever 74, with the other end of lever 74 pivotally attached to the opposing end of the locking member 22. Spacer 76 allows the floating lever 74 to remain substantially parallel to the door when closed. Floating lever 74 is depicted as having a horse shoe shape, but a simple straight lever, optionally notched for the safety device, may be used. When the handle end is adjacent the door, the locking ring is prevented from moving radially inward to open the door. Pulling the handle away form the door pulls the pivot between lever 72 and lever 74 away from the door, moving the locking segment radially inward so that the door can be opened.

Operation consists of engagement of operating lever 78 as shown in FIG. 10 into vertical support 77, which is fixed to lever 72, followed by partial rotation of lever 72 by manual force on lever 78. This partial rotation effectively pulls the two ends of locking member segment 22 together, thereby permitting the opening or closing of the door. If desired, a biasing member, such as band 28, may bias the locking member to the expanded (locked) position.

Figure 11A:
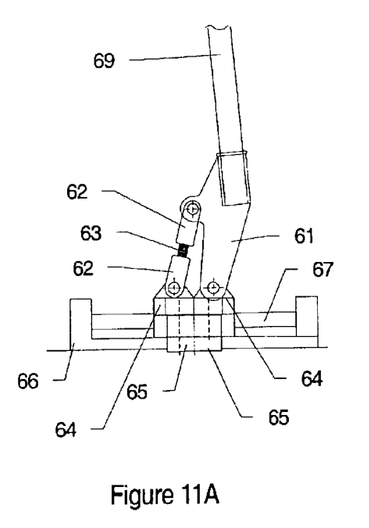
FIGS. 11A and 11B depict the open and the closed positions, respectively, of this embodiment.
Figure 11B:
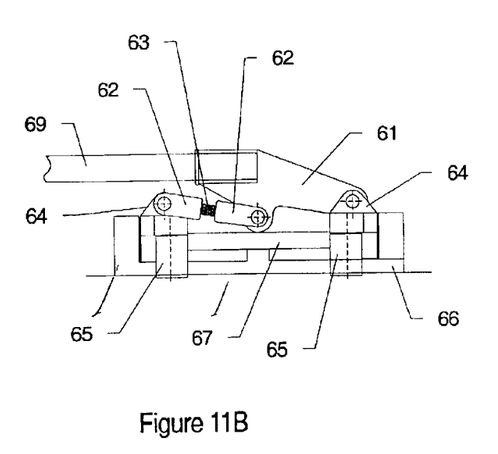

An alternative arrangement is depicted in FIG. 11, whereby the rotational movement of lever 69 pivots the lever body 61 to cause the linear movement of control fingers 64 (see FIGS. 11A and 11B) due to the tie rod 62. Body 61 is pivotally attached to one of the control fingers 64, and also to tie rod 62, which in turn is pivotally attached to the other control finger. Adjustment of the distance traveled by control fingers 64 may be controlled by threaded union 63. Linear movement of control fingers 64 is transferred to the locking ring 22 by roll pins 68 inserted into locking ring end pieces 65. Slide rods 67 insure a consistent linear travel path of the control fingers 64 and may be secured by bracket 66 attached to door 20. Rotational movement of lever 61 causes linear movement of the locking ring 22 to cause opening or closing of the locking ring assembly.

An alternative design is shown in FIG. 12 whereby rotational movement of lever 85 is transferred to linear movement of the locking ring 22. This arrangement includes a lever 81 that engages lever body 82, which pivots about swivel joint 81. Swivel joint 81 is attached to end piece 80 that is attached to locking ring 22. As with the previously discussed design, body 82 is also pivotally attached to the tie rod assembly, which in turn is pivotally attached to the opposing end piece 80 on the opposite end of the locking ring. Adjustment may be made by threaded union 84. Rotational movement of lever 85 causes radial movement of the locking ring 22 to cause opening or closing of the assembly.

Figure 13:
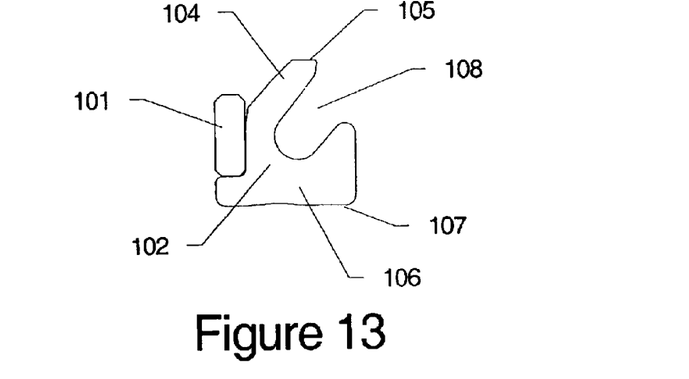
FIG. 13 illustrates a cross sectional view of a pressure activated seal and back-up ring.
Figure 13A:
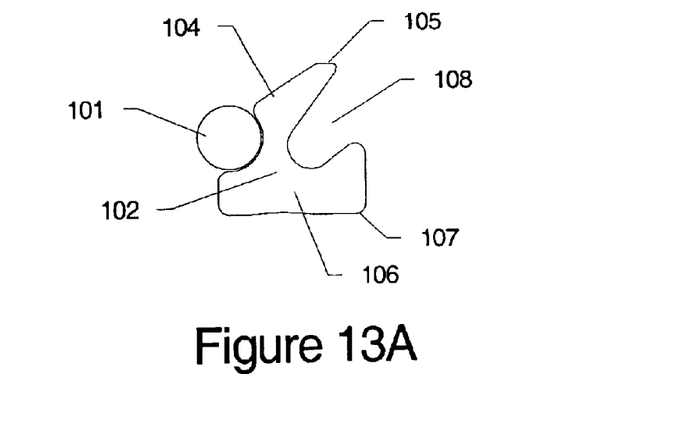
FIG. 13A illustrates a pressure activated seal and a circular backup ring.
Figure 13B:
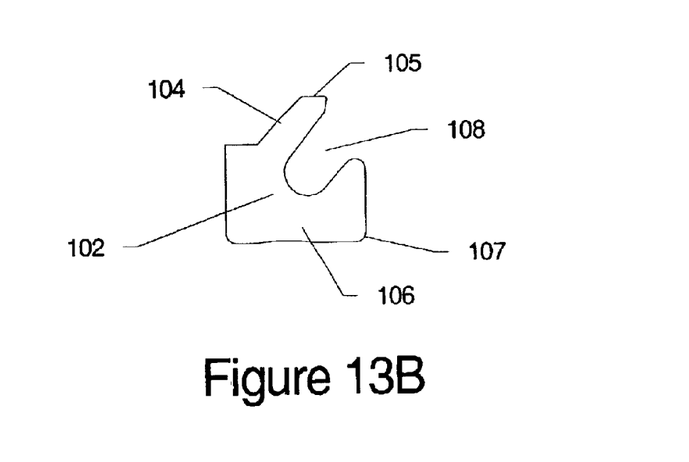
FIG. 13B illustrates a pressure activated seal with no backup ring.

If the closure is operated by hand, a limited force is available to energize the seal 26. An o-ring seal will likely acquire a higher force to fully energize the seal with large diameter closures to fully energize the seal. Seal 26 preferably is a fluid energized or lip seal with an anti-extrusion back-up 27. FIGS. 13, 13A and 13B depict several embodiments of a fluid energized seal 26 that are of similar cross-sectional but with varying styles of or no anti-extension back up ring. Seal 26 preferably comprising an annular elastomeric body 102, and an anti-extrusion 101, which is preferably manufactured in a material harder than that of the body 102. The body 102 is fluid energized in that pressure to the right of upper leg 104 and base leg 106 fills the cavity 108, thereby forcing the base leg 106 downward and the upper leg 104 upward, bringing the sealing surfaces 105 and 107 into reliable sealing engagement with, in this case, the door and the neck. Those skilled in the art appreciate that the seal body 102 is shown in its as-manufactured position and before being fitted on the door. Various types of fluid energized seals may be used, with an optional backup 101 substantially minimizing or preventing extrusion of the body 102 under high pressure. As suggested by the above, higher fluid pressure strongly forces the surfaces 105, 107 into a fluid tight seal with the planar surface. Due to manufacturing tolerances, a gap will exist between the seal and its mating surface, and the seal must close this gap under high pressure differentials. Also, the seal should be designed so that it can withstand tolerance changes due to temperature variations, corrosion and debris build up. Ideally, the seals itself is a single piece molded product. The anti-extrusion backup ring 101 may be either a coiled spring or flat strip of metal. An extruded seal with a separate back-up ring 101 provides a significant cost saving and flexibility. Various cross-sections and materials may be used for the pressure sealing member 26, and the seal may be located either on the side or underside surfaces of door 22, or within the neck 12. Those skilled in the art will appreciate that the closure according to the present invention may be used in conjunction with various types of pressure vessels, including pipes, pressure tanks, storage tanks, and other conventional vessels. The closure door 22 may be supplied with either a hinge as shown in FIG. 1 or lifting davit as shown in FIG. 2 suitable for either horizontal or vertical operation.

Various other modifications to the closure mount as disclosed herein should be apparent from the above description of preferred embodiments. Although the invention has thus been described in detail for these embodiments, it should be understood that this explanation is for illustration, and that the invention is not limited to these embodiments. Alternate components and installation techniques will be apparent to those skilled in the art in view of this disclosure. Additional modifications are thus contemplated and may be made without departing from the spirit of the invention, which is defined by the claims.

What is claimed is:

1. A closure for sealing with a pressure vessel, the closure comprising:
    a neck for attaching to the vessel, the neck having an access port and an interior profile for radially receiving a circumferential locking member when the door is in the closed position;
    a door sized to close off the access port in the neck;
    the circumferential locking member carried by the door for locking the door to the neck, the locking member being radially moveable between an open radially inward position and a closed radially outward position;
    a seal for sealing between the neck and the door when the locking member is in the closed position;
    an operator for moving the locking member between the open position and the closed position; and
    the locking member comprises a plurality of locking segments interconnected by a flexible band positioned within a radially inward opening slot in each of the locking segments, with each locking member including a neck portion having a width less than a width of the flexible band to retain the flexible band within the slot.

2. A closure as defined in claim 1, further comprising:
    a locking segment movable between a lock position in a circumferential gap in the locking member to prevent radial contraction of the locking member and a release position spaced radially from the circumferential gap to permit radial contraction of the locking member.

3. A closure as defined in claim 1, further comprising:
    a hand operated lever moveable from a closed position to an open position; and
    a linkage mechanism interconnecting the lever with each of the pair of control fingers, such that movement of the lever linearly moves each of the control fingers, thereby opening and closing the locking member.

4. A closure as defined in claim 3, further comprising:
    an adjustment member for adjusting the linking mechanism to alter the position of the locking member with respect to the lever.

5. A method of opening and closing a door sized to close off an access port in a neck attached to a pressure vessel, the method comprising:
    forming a circumferential locking member from a plurality of locking segments, with an end of one segment being interconnected with an adjacent segment by a flexible band positioned within a radially inward opening slot in each of the locking segments, each locking member including a neck portion having a width less than a width of the flexible band to retain the flexible band within the slot, the locking member carried on the door and moveable between an open position for opening the door from the neck and a dosed position to close off the access port in the neck with the door;
    providing an interior profile in the neck for radially receiving the locking member when the door is in the closed position;
    moving the locking member from the open position wherein the locking ring is radially retracted to the closed position wherein the locking member is radially expanded into the interior profile in the neck; and
    sealing between the door and the neck when the locking member is in the closed position.

6. A method as defined in claim 5, further comprising:
    moving a lever from an open position to a closed position to open and close the door;
    providing a linkage mechanism interconnecting the lever with each of a pair of control members, such that movement of the lever linearly moves each of the control members in opposing directions along a common axis, thereby opening and closing the locking member; and providing each of the pair of control members substantially adjacent a respective end of the locking member when in the opened and the closed position.

7. A method as defined in claim 5, further comprising:

interconnecting a lever with a linkage mechanism;

interconnecting the linkage mechanism with opposing ends of the circumferential locking member; and moving a lever to move the linkage member between an open position and a closed position.

8. A method as defined in claim 5, further comprising:

moving a locking segment between a lock position in a circumferential gap in the locking member to prevent radial contraction of the locking member and a release position spaced radially from the circumferential gap to permit radial contraction of the locking member.

9. A closure for sealing with a pressure vessel, the closure comprising:

a neck for attaching to the vessel, the neck having an access port and an interior profile for radially receiving a locking member;

a door sized to close off the access port In the neck and fit within the neck when the door is closed;

the locking member carried by the door for locking the door to the neck, the locking member including a plurality of locking segments, the locking member being radially moveable between an open radially retracted position and a closed radially expanded position;

a seal for sealing between the neck and the door when the locking member is in the closed position;

a flexible band removably connectable with the plurality of locking segments, the band positioned within a radially inward opening slot in each of the locking segments; and an operator for moving the locking member between the open position and a closed position.

10. A closure as defined in claim 9, further comprising:

a locking segment movable between a lock position in a circumferential gap in the locking member to prevent radial contraction of the locking member and a release position spaced radially from the circumferential gap to permit radial contraction of the locking member.

11. A closure as defined in claim 9, wherein the seal comprises:

a pressure energized elastomeric seal; and a backup ring to support the pressure energized seal.

12. A closure as defined in claim 9, wherein the operator includes a pair of control members each substantially linearly moveable with respect to the door in opposing directions along a common axis of a slide member and pivotally connected to a respective end of the circumferential locking member.

13. A closure as defined in claim 9, further comprising:

a hand operated lever moveable from a closed position to an open position; and a linkage mechanism interconnecting the lever with each of the pair of control members, such that movement of the lever linearly moves each of the control members, thereby opening and closing the locking member.

14. A closure as defined in claim 9, wherein each of the plurality of locking members includes a neck portion having a width less than a width of the flexible band to retain the flexible band within the slot.

* * * * *